US012569104B2

(12) United States Patent
Zhou et al.

(10) Patent No.: US 12,569,104 B2
(45) Date of Patent: Mar. 10, 2026

(54) LIQUID TANK AND BASE STATION

(71) Applicant: SHENZHEN SILVER STAR INTELLIGENT GROUP CO., LTD., Shenzhen (CN)

(72) Inventors: Linlin Zhou, Shenzhen (CN); Wenhai Deng, Shenzhen (CN); Jie Liang, Shenzhen (CN); Wenbin Yong, Shenzhen (CN); Qingshuang Lv, Shenzhen (CN)

(73) Assignee: SHENZHEN SILVER STAR INTELLIGENT GROUP CO., LTD., Shenzhen (CN)

(*) Notice: Subject to any disclaimer, the term of this patent is extended or adjusted under 35 U.S.C. 154(b) by 727 days.

(21) Appl. No.: 17/898,842

(22) Filed: Aug. 30, 2022

(65) Prior Publication Data

US 2023/0148823 A1 May 18, 2023

(30) Foreign Application Priority Data

Nov. 17, 2021 (CN) ......................... 202111369707.6

(51) Int. Cl.
*A47L 11/40* (2006.01)
*B08B 3/04* (2006.01)

(52) U.S. Cl.
CPC .......... *A47L 11/4091* (2013.01); *B08B 3/041* (2013.01); *A47L 2201/02* (2013.01)

(58) Field of Classification Search
CPC ............... B65D 25/14–18; B65F 1/068; A47L 11/0483; A47L 11/4016; A47L 11/0036; A47L 11/08; A47L 11/201; A47L 11/4025; A47L 2201/02; A47L 2201/024; A47L 2201/026
USPC ...................................... 206/520; 220/495.06
See application file for complete search history.

(56) References Cited

U.S. PATENT DOCUMENTS

| | | | | |
|---|---|---|---|---|
| 2,758,747 A | 8/1956 | Stevens | | |
| 3,060,484 A * | 10/1962 | Krammes | ........... | A47L 11/4025 15/353 |
| 4,650,086 A * | 3/1987 | Morrison, Jr. | ............ | B65F 1/02 588/259 |

(Continued)

FOREIGN PATENT DOCUMENTS

| | | |
|---|---|---|
| CN | 102635082 A | 8/2012 |
| CN | 210228026 U | 4/2020 |

(Continued)

OTHER PUBLICATIONS

CN-211933903-U translation (Year: 2020).*

*Primary Examiner* — Mollie Impink
(74) *Attorney, Agent, or Firm* — IPRO, PLLC; Na Xu

(57) ABSTRACT

A liquid tank for a base station includes a first liquid storage structure and a second liquid storage structure. The second liquid storage structure is positioned in the first liquid storage structure. The second liquid storage structure is flexible and variable in volume. A space is defined between a structural wall of the first liquid storage structure and a structural wall of the second liquid storage structure and is configured to store liquid. The first liquid storage structure includes an anti-sticking structure. The anti-sticking structure is positioned on a bottom surface of the first liquid storage structure facing the second liquid storage structure.

17 Claims, 6 Drawing Sheets

(56) References Cited

U.S. PATENT DOCUMENTS

| | | | | | |
|---|---|---|---|---|---|
| 4,858,269 | A * | 8/1989 | Ostroski | A47L 11/4019 | 15/327.2 |
| 5,409,110 | A * | 4/1995 | Patent | B65D 19/44 | 206/335 |
| 5,735,017 | A * | 4/1998 | Barnes | A47L 11/4027 | 15/328 |
| 5,908,133 | A * | 6/1999 | Luburic | B65D 81/261 | 220/571 |
| 6,131,237 | A * | 10/2000 | Kasper | A47L 11/4088 | 15/320 |
| 6,736,281 | B2 * | 5/2004 | Joseph | B65F 1/068 | 220/495.04 |
| 8,813,992 | B2 * | 8/2014 | Chitayat | B65F 1/06 | 220/495.04 |
| 9,579,008 | B2 * | 2/2017 | Crocker | A47L 11/4083 | |
| 2014/0103034 | A1 * | 4/2014 | Ross | B65D 77/061 | 220/666 |

FOREIGN PATENT DOCUMENTS

| | | | | |
|---|---|---|---|---|
| CN | 111839377 | A | 10/2020 | |
| CN | 211933903 | U * | 11/2020 | |
| CN | 113509115 | A | 10/2021 | |
| CN | 217885929 | U | 11/2022 | |
| FR | 2708216 | A1 * | 2/1995 | A47L 11/30 |
| WO | 2014147614 | A1 | 9/2014 | |

* cited by examiner

LIQUID TANK AND BASE STATION

CROSS-REFERENCE TO RELATED APPLICATIONS

The present disclosure claims priority of Chinese Patent Application No. 202111369707.6, filed on Nov. 17, 2021, titled "integrated liquid tank and base station", the contents of which are incorporated herein by reference.

TECHNICAL FIELD

The present disclosure relates to the technical field of cleaning systems, and in particular, relates to a liquid tank and a base station.

BACKGROUND

A base station is generally equipped with two liquid storage tanks, one of the two liquid storage tanks is configured to store cleaning liquid, and another of the two liquid storage tanks is configured to store sewage. Because the base station is equipped with two liquid storage tanks, the base station occupies a large volume and the construction cost thereof is high.

Therefore, after creative efforts, the inventors of the present disclosure come up with an integrated liquid tank used in the base station. The integrated liquid tank is formed by nesting two liquid tanks. Because the material of the liquid tank nested inside is flexible and variable, when the liquid tank nested inside is full of water, the bottom wall thereof is easy to stick to the bottom wall of the external liquid tank, and thus it is not easy to separate the two liquid tanks.

SUMMARY

An embodiment of the present disclosure provides a liquid tank for a base station. The liquid tank includes a first liquid storage structure and a second liquid storage structure. The second liquid storage structure is positioned in the first liquid storage structure. The second liquid storage structure is flexible and variable in volume. A space is defined between a structural wall of the first liquid storage structure and a structural wall of the second liquid storage structure and is configured to store liquid. The first liquid storage structure includes an anti-sticking structure. The anti-sticking structure is positioned on a bottom surface of the first liquid storage structure facing the second liquid storage structure.

BRIEF DESCRIPTION OF THE DRAWINGS

In order to explain embodiments of the present disclosure or technical solutions in the prior art more clearly, attached drawings required in the description of the embodiments or the prior art will be briefly introduced below. Obviously, the attached drawings in the following description are only some embodiments of the present disclosure. For those of ordinary skill in the art, other drawings can be obtained according to the structures shown in these attached drawings without creative labor.

Implementation of objectives, functional features and advantages of the present disclosure will be further described in combination with embodiments and with reference to attached drawings.

DETAILED DESCRIPTION

Hereinafter, technical solutions in embodiments of the present disclosure will be described clearly and completely with reference to attached drawings in the embodiments of the present disclosure. Obviously, the embodiments described are only part but not all of the embodiments of the present disclosure. Based on the embodiments of the present disclosure, all other embodiments obtained by those of ordinary skill in the art without creative labor belong to the protective scope claimed in the present disclosure.

It shall be noted that, all directional indicators (such as up, down, left, right, front, back and so on) in the embodiment of the present disclosure are only used to explain relative position relationships and movement situations among components in a specific posture (as shown in the attached drawing). If the specific posture changes, the directional indicators will change accordingly.

In addition, in the present disclosure, descriptions such as "first", "second" or the like are only used for descriptive purposes, and shall not be understood as indicating or implying the relative importance thereof or implicitly indicating the number of indicated technical features. Therefore, features defined with "first" and "second" may explicitly or implicitly include at least one of the features. In addition, technical solutions among the embodiments may be combined with each other on the basis that they can be realized by those of ordinary skill in the art. When the combination of the technical solutions is contradictory or impossible to be realized, it shall be considered that such combination of the technical solutions does not exist, and it is not within the protective scope claimed in the present disclosure.

Figure 1:
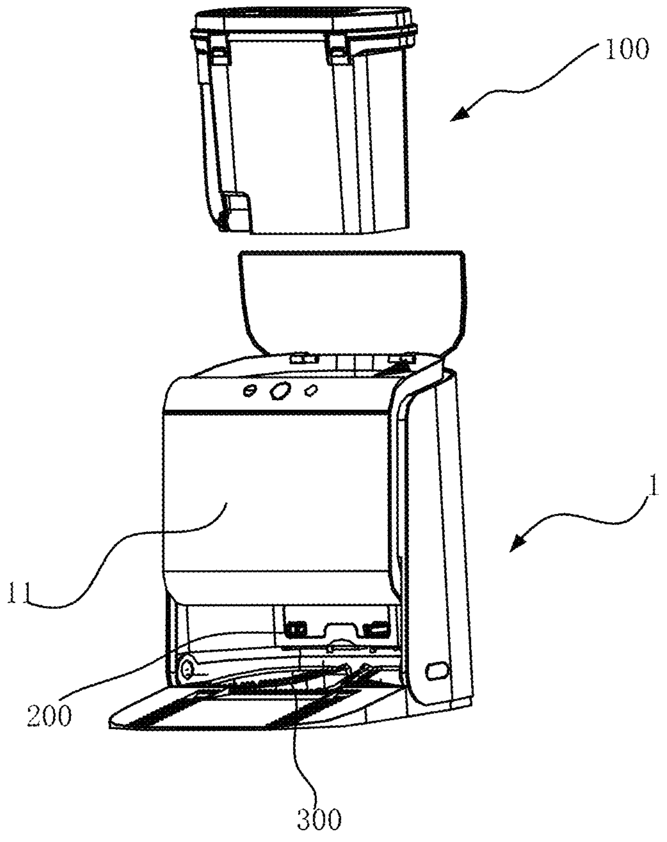
FIG. 1 is a schematic structural view of a liquid tank disassembled from a base station according to an embodiment of the present disclosure.
Figure 2:
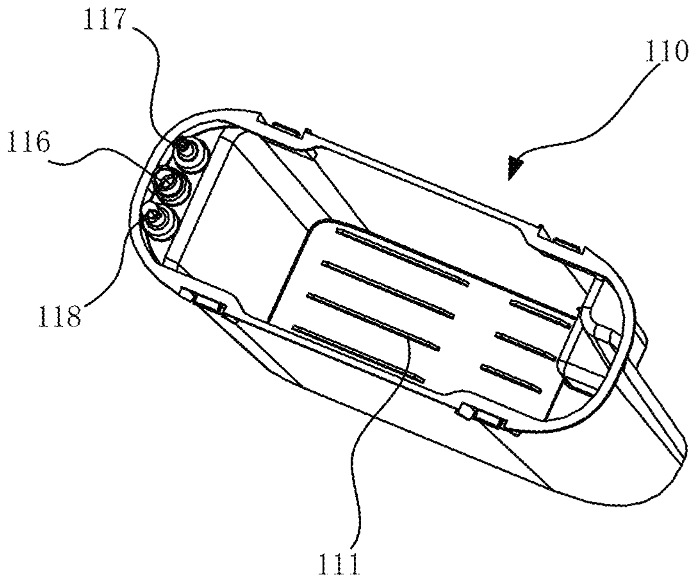
FIG. 2 is a schematic structural view of an embodiment of a first liquid storage structure.
Figure 9:
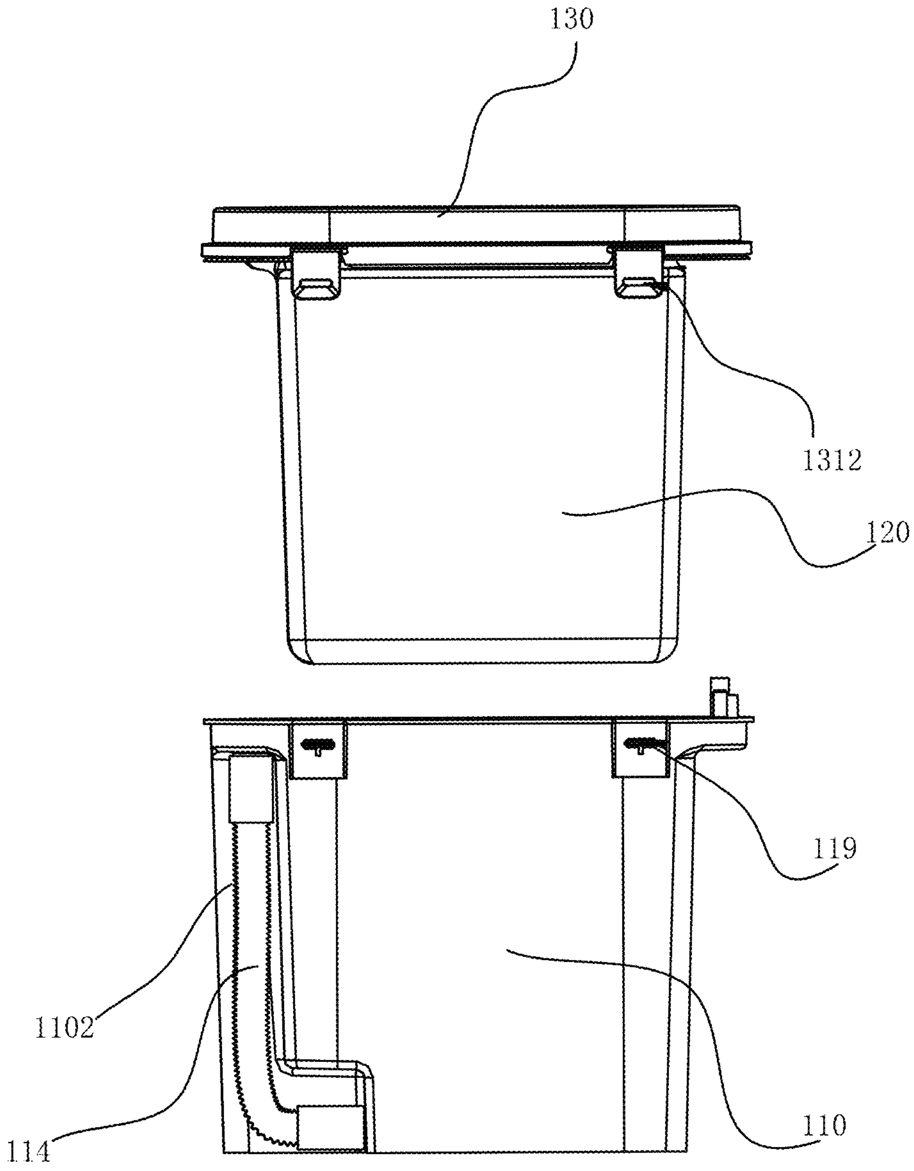
FIG. 9 is a schematic structural view of the second liquid storage structure separated from the first liquid storage structure.

Referring to FIG. 1, FIG. 2 and FIG. 9, an embodiment of the present disclosure provides a liquid tank 100, which is applied to a base station 1. The liquid tank 100 includes a first liquid storage structure 110 and a second liquid storage structure 120. The second liquid storage structure 120 is embedded in the first liquid storage structure 110, and the second liquid storage structure 120 is flexible and variable in volume. The space between the structural wall of the first liquid storage structure 110 and the structural wall of the second liquid storage structure 120 is configured to store liquid; and the bottom surface of the first liquid storage structure 110 facing the second liquid storage structure 120 is provided with an anti-sticking structure.

Since the second liquid storage structure 120 is embedded in the first liquid storage structure 110, and the second liquid storage structure 120 is flexible and variable in volume, with the decrease of liquid in the second liquid storage structure 120, the volume of the second liquid storage structure 120 decreases, and the storage space between the structural wall of the second liquid storage structure 120 and the structural wall of the first liquid storage structure 110 increases. On the contrary, with the increase of liquid in the second liquid storage structure 120, the volume of the second liquid storage structure 120 increases, and the storage space between the structural wall of the second liquid storage structure 120 and the structural wall of the first liquid storage structure 110 decreases. Thus, by the alternating increase and decrease of the liquid in the two liquid storage structures, the liquid of the two liquid storage structures is stored in one box, thereby avoiding the technical solution in which two liquid storage tanks are required in the prior art, reducing the volume occupied by the liquid tanks, reducing the construction cost, and increasing the storage space. Secondly, the bottom surface of the first liquid storage structure 110 facing the second liquid storage structure 120 is provided with the anti-sticking structure. In this way, the structural wall of the second liquid storage structure 120 made of flexible material is prevented from sticking to the structural wall of the first liquid storage structure 110, which is beneficial to liquid circulation and separation of the two liquid storage structures.

In this embodiment, the first liquid storage structure 110 is a sewage tank for storing sewage, the second liquid storage structure 120 is a cleaning liquid bag for storing cleaning solution, and the cleaning solution may be clean water or cleaning agent. The cleaning solution of the second liquid storage structure 120 is used for cleaning the mop of the cleaning robot, the cleaning solution becomes sewage after washing the mop, and the sewage is recycled into the first liquid storage structure 110 by a liquid pumping system. As the amount of cleaning solution in the second liquid storage structure 120, i.e., the cleaning liquid bag, decreases, the amount of sewage in the first liquid storage structure 110, i.e., the sewage tank, increases correspondingly. However, in general, the alternating changes of the two liquid amounts are all within the total volume of the first liquid storage structure 110. Thus, as a whole, the use of cleaning solution and the recycle of sewage in the base station 1 are realized by using the occupied space of one liquid storage structure, thereby avoiding the technical solution in which two liquid storage tanks are required in the prior art, reducing the volume occupied by the liquid tanks, reducing the construction cost, and increasing the storage space.

It shall be noted that, the first liquid storage structure 110 may also be configured to store cleaning solution, and the second liquid storage structure 120 may be configured to recycle sewage.

In this embodiment, the first liquid storage structure 110 is a rigid shell and the second liquid storage structure 120 is a cleaning liquid bag. It should be noted that, in other embodiments, both the first liquid storage structure 110 and the second liquid storage structure 120 may be made of flexible materials, as long as it is ensured that the second liquid storage structure 120 is made of flexible material and embedded in the first liquid storage structure 110.

In this embodiment, the first liquid storage structure 110 is a rigid shell, this can improve the reliability of the first liquid storage structure 110. As compared to the first liquid storage structure 110 made of flexible material, it is convenient for users to clean the inner wall of the first liquid storage structure 110 that is a rigid shell.

Because the second liquid storage structure 120 is made of flexible material and embedded in the first liquid storage structure 110, when the second liquid storage structure 120 is fully filled with liquid, the bottom wall of the second liquid storage structure 120 will easily stick to the inner wall of the first liquid storage structure 110 under the action of gravity. On one hand, it is not easy to separate the second liquid storage structure 120 from the first liquid storage structure 110 when it is required to separate the second liquid storage structure 120 from the first liquid storage structure 110, and on the other hand, it is unfavorable for liquid circulation at the bottom wall of the first liquid storage structure 110.

Therefore, in order to facilitate the circulation of liquid and facilitate the separation of the two liquid storage structures, in this embodiment, the bottom surface of the first liquid storage structure 110 facing the second liquid storage structure 120 is provided with an anti-sticking structure.

Furthermore, in this embodiment, the anti-sticking structure includes convex structures.

Of course, it shall be noted that, the anti-sticking structure may also be a net-shaped partition plate which is arranged at the bottom wall of the first liquid storage structure 110, and the second liquid storage structure 120 is placed on the net-shaped partition plate. Because the partition plate is a net-shaped structure, the contact area between the net-shaped partition plate and the bottom wall of the second liquid storage structure 120 is reduced as compared to a flat planar structure, and gaps are formed between the hollowed-out parts of the net-shaped partition plate and the bottom wall of the second liquid storage structure 120. Therefore, the net-shaped partition plate can achieve the effect of preventing the second liquid storage structure 120 made of flexible material from sticking to the bottom wall of the first liquid storage structure 110. In some embodiments, when the sewage in the first liquid storage structure 110 needs to be dumped, the net-shaped partition plate may be lifted first to filter out the large-particle impurities. In this way, before dumping the sewage, the large-particle impurities are first dumped into the trash bin by using the net-shaped partition plate, and then the sewage is dumped into the sewer, thereby preventing the large-particle impurities mixed with the sewage from being poured into the sewer and blocking the sewer.

In this embodiment, the convex structures are convex ribs 111 that are formed on the bottom surface of the first liquid storage structure 110 and protrudes towards the bottom surface of the second liquid storage structure 120. Of course, it should be understood that, part of the bottom wall of the first liquid storage structure 110 may be concave to correspondingly form the convex structures, and the convex structures are not necessarily the convex ribs 111, but may also be spherical bump structures or cylindrical bump structures. The shapes of the convex structures may be various, which are not listed herein.

Figure 4:
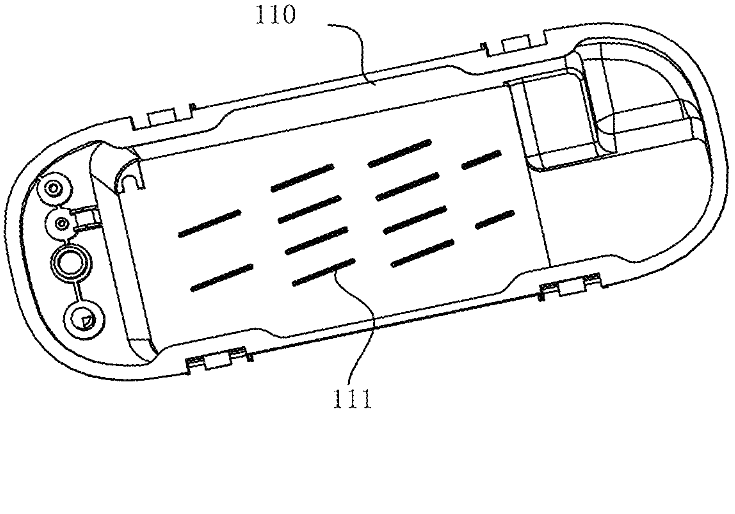
FIG. 4 is a schematic structural view of another embodiment of the first liquid storage structure.

Referring to FIG. 2 and FIG. 4, in this embodiment, the convex structures extend along the length direction of the first liquid storage structure 110, the convex structures are arranged in a plurality of columns, and the convex structures of each column are arranged at intervals. As the convex structures in each column are arranged at intervals, a plurality of force bearing points may be formed to support the bottom wall of the second liquid storage structure 120 made of flexible material, and it is easier to support the second liquid storage structure 120. In this way, more gaps are formed between the structural wall of the second liquid storage structure 120 and the structural wall of the first liquid storage structure 110, and the anti-sticking effect is better. It shall be noted that, the number of columns and rows of the convex structures are set according to the area of the bottom wall of the first liquid storage structure 110.

In this embodiment, the convex ribs 111 extend along the length direction of the first liquid storage structure 110, the convex ribs 111 are arranged in a plurality of columns, and the convex ribs 111 of each column are arranged at intervals.

Of course, in other embodiments, the convex ribs 111 do not necessarily extend along the length direction of the first liquid storage structure 110. The convex ribs 111 may be arc-shaped convex rib structures, circular convex rib structures, or even triangular structures enclosed by convex ribs. The shapes of the convex ribs are various, which are not exemplified herein one by one.

In this embodiment, the convex ribs extend along the length direction of the first liquid storage structure 110, which is simple in process and can achieve a good anti-sticking effect.

It shall be noted that, the length direction of the first liquid storage structure 110 is the long side direction based on the bottom surface of the first liquid storage structure 110.

Referring to FIG. 4, in this embodiment, each of the convex ribs 111 in each column is staggered with the convex rib 111 in the adjacent column. The staggered arrangement can disperse the force bearing points at the bottom wall of the second liquid storage structure 120 and prevent the convex ribs 111 from being arranged in an array. Otherwise, the bottom wall of the second liquid storage structure 120 sinks into the area formed between every two rows of convex ribs 111, and then the bottom wall of the second liquid storage structure 120 sticks to the area formed between every two rows of convex ribs 111, and thus the bottom wall of the second liquid storage structure 120 sticks to the bottom wall of the first liquid storage structure 110 in the form of an array.

In some embodiments, the convex ribs 111 of one of every two columns may extend between two convex ribs 111 of the other column, such that the second liquid storage structure 120 can be prevented from sinking between two convex ribs 111 of the column.

Figure 3:
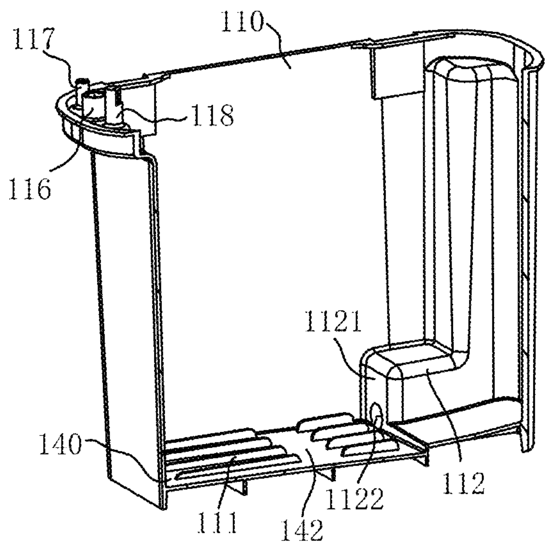
FIG. 3 is a cross-sectional view of the first liquid storage structure.

Referring to FIG. 3, further, the edge of each convex rib 111 is arc-shaped. In this way, the edge of each convex rib 111 can be prevented from being sharp and piercing the second liquid storage structure 120 made of flexible material. Specifically, two sides of the convex rib 111 are arc-shaped along the long side direction of the convex 111, and another two sides of the convex rib 111 are rounded corners along the width direction of the convex rib 111.

There are two embodiments for the arrangement of the convex ribs 111.

First embodiment: as shown in FIG. 2, the long side direction of each convex rib 111 is parallel to the length direction of the first liquid storage structure 110, and the convex ribs 111 in each row are arranged flush with each other.

Second embodiment: as shown in FIG. 4, the long side direction of each convex rib 111 is set at a certain angle with respect to the length direction of the first liquid storage structure 110, and each of the convex ribs 111 in each column is staggered with the convex ribs 111 in the adjacent column.

Figure 5:
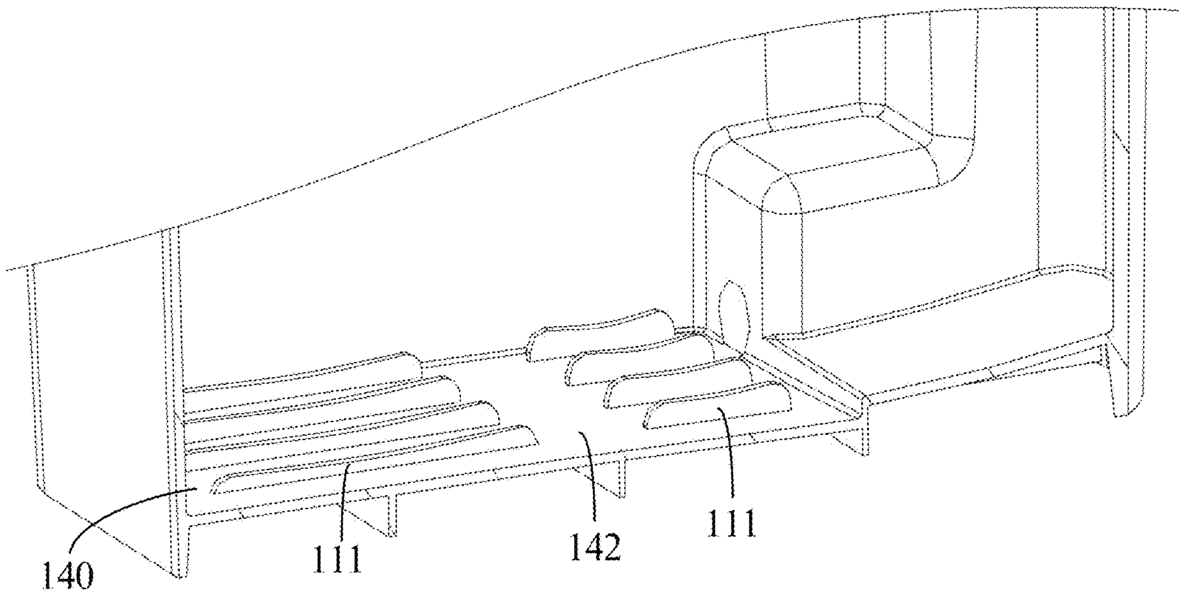
FIG. 5 is a partial schematic structural view of still another embodiment of the first liquid storage structure.

In other embodiments, referring to FIG. 5, the middle part of the upper end of each convex rib 111 is concave. If the area of the upper end of the convex rib 111 is not large enough, when the second liquid storage structure 120 made of flexible material is fully filled with cleaning solution, the pressure of the upper end of each convex rib 111 on the second liquid storage structure 120 will be relatively large, and the second liquid storage structure 120 will be readily worn out after long-term use. If the area of the upper end of each convex rib 111 is large, when the second liquid storage structure 120 made of flexible material is fully filled with cleaning solution, it is easy for the second liquid storage structure 120 to stick to the upper end of each convex rib 111. Therefore, the middle part of each convex rib 111 may be concave, and the edge of each convex rib 111 is arc-shaped. Because the middle part of the upper end is concave, when the second liquid storage structure 120 is fully filled with cleaning solution, the bottom wall of the second liquid storage structure 120 will sink into the concave part. However, as compared to a flat surface, the concave upper surface of the convex rib 111 tends to form a gap with the second liquid storage structure 120, so it is not easy for the second liquid storage structure 120 to stick to the convex ribs 111. Moreover, as compared to a flat surface, the concave upper surface has a wider contact area with the second liquid storage structure 120, so the pressure on the second liquid storage structure 120 is not so great, and thus the second liquid storage structure 120 will not be worn out easily.

In this embodiment, the first liquid storage structure 110 is configured to store sewage, and the liquid tank 100 further includes a drainage pipe 114. A drainage outlet 1122 is defined at the bottom wall of the first liquid storage structure 110, and the drainage pipe 114 is connected with the drainage outlet 1122. With the arrangement of the drainage pipe 114, the user can directly aims the drainage pipe 114 at the sewer to drain the sewage without opening the cover of the first liquid storage structure 110 to dump the sewage, which is simple and convenient and improves the user experience. Furthermore, in this embodiment, the bottom wall of the first liquid storage structure 110 is provided with a convex structure, such that the problem that the second liquid storage structure 120 sticks to the bottom wall of the first liquid storage structure 110 to block the drainage outlet 1122 and thus the sewage in the first liquid storage structure 110 cannot be discharged can be prevented.

In some embodiments, referring to FIG. 3, FIG. 6, FIG. 8 and FIG. 9, portion 1102 of the outer peripheral wall of the first liquid storage structure 110 is concave, such that the inner peripheral wall of the first liquid storage structure 110 is correspondingly convex to form a drainage part 112, the side of the drainage part 112 facing the convex structure is a drainage surface 1121, the drainage outlet 1122 is defined on the drainage surface 1121, and the drainage pipe 114 is accommodated in the concave portion 1102 of the outer peripheral wall of the first liquid storage structure 110. By accommodating the drainage pipe 114 in the concave portion 1102 of the outer peripheral wall of the first liquid storage structure 110, the drainage pipe 114 is prevented from protruding from the outer peripheral wall of the first liquid storage structure 110. In an embodiment, the concave portion 1102 of the outer peripheral wall of the first liquid storage structure 110 is arranged at the edge of the outer peripheral wall of the first liquid storage structure 110.

It shall be noted that, when the drainage outlet 1122 is arranged at the drainage surface 1121, it is also possible that the second liquid storage structure 120 made of flexible material sticks to the drainage surface 1121. If the bottom wall of the first liquid storage structure 110 is not provided with the anti-sticking structure and the second liquid storage structure 120 sticks to both the drainage surface 1121 and the bottom wall of the first liquid storage structure 110, the sewage cannot be discharged through the drainage outlet

1122. Therefore, in this embodiment, the anti-sticking structure is positioned on the bottom wall of the first liquid storage structure 110, such that the gaps between the bottom wall of the second liquid storage structure 120 and the bottom wall of the first liquid storage structure 110 are defined, the sewage can be discharged from the drainage outlet 1122 through the gaps even if the second liquid storage structure 120 sticks to the drainage surface 1121.

In this embodiment, the central axis of the drainage outlet 1122 is parallel to a horizontal line, that is, the drainage outlet 1122 is arranged laterally and faces the convex ribs 111. The convex ribs 111 are arranged adjacent to the drainage outlet 1122, such that the bottom wall of the second liquid storage structure 120 can be better prevented from sticking to the bottom wall of the first liquid storage structure 110 at the drainage outlet 1122, and the circulation of sewage can be better, which is more conducive to discharging the sewage from the drainage outlet 1122.

In this embodiment, referring to FIG. 3, the bottom wall of the first liquid storage structure 110 includes a blank part 140, a drainage part 112, and an anti-sticking part 142. The anti-sticking part 142 is provided with the convex structures, and the blank part 140 and the drainage part 112 are arranged side by side at the sides of the anti-sticking part 142. The drainage part 112 protrudes from the bottom wall of the first liquid storage structure 110, and the drainage outlet 1122 is arranged on the drainage part 112 and faces the convex ribs 111. The anti-sticking part 142 is obliquely arranged from the edge of the blank part 140 to the drainage outlet 1122, which is beneficial to the smooth discharge of sewage from the drainage outlet 1122. The blank part 140 is obliquely arranged from the edge of the first liquid storage structure 110 to the anti-sticking part 142, such that the drainage outlet 1122 is arranged at the lowest end of the first liquid storage structure 110, which is beneficial to the discharge of sewage from the drainage outlet 1122.

In some embodiments, the edge of the drainage part 112 is arc-shaped, thereby preventing the drainage part 112 from scratching the structural wall of the second liquid storage structure 120.

Specifically, the diameter of the drainage outlet 1122 is set according to the actual drainage time, and in an embodiment the shape of the drainage outlet 1122 is a circular opening. Of course, in other embodiments the drainage outlet 1122 may also have other shapes, which are not exemplified herein one by one.

Figure 6:
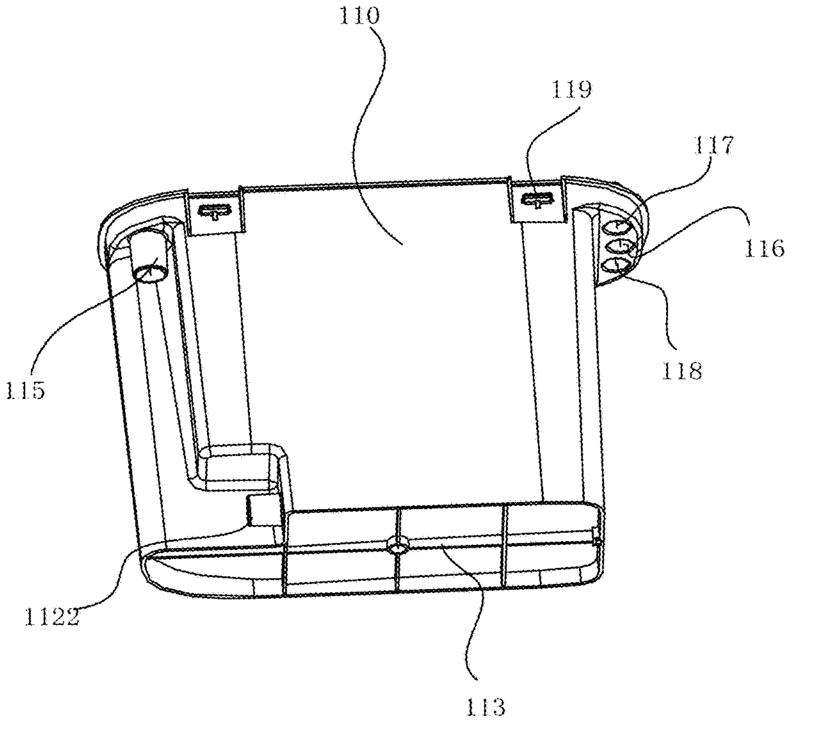
FIG. 6 is a schematic structural view of the first liquid storage structure from another perspective.

Referring to FIG. 6, in this embodiment, the first liquid storage structure 110 is a rigid shell, and the convex structures run through the bottom wall of the first liquid storage structure 110 to form reinforcing ribs 113. The reinforcing ribs 113 can make the structural wall of the first liquid storage structure 110 firmer, and the reinforcing ribs 113 are integrally formed with the bottom wall of the first liquid storage structure 110 by the convex structures running through the bottom wall of the first liquid storage structure 110, so the processing technology is simple.

In this embodiment, the material of the convex structures is not limited, and the convex structures may be made of flexible material or rigid material. When the first liquid storage structure 110 is made of rigid material, the convex structures are also made of rigid material, such that on one hand, the anti-sticking effect is higher, on the other hand, it is easy for processing in the process of integral molding.

Of course, it shall be noted that, the reinforcing ribs 113 are not necessarily to be integrally formed with the bottom wall of the first liquid storage structure 110 by the convex structures running through the bottom wall of the first liquid storage structure 110, and the reinforcing ribs 113 may also be formed by combining reinforcing ribs 113 that are arranged vertically and horizontally. It shall be noted that, the edge of the bottom wall of the first liquid storage structure 110 may protrude outwards to form the reinforcing ribs 113, such that when the first liquid storage structure 110 is fully filled with sewage, the bottom wall of the first liquid storage structure 110 can be prevented from being broken when it directly falls to the ground by accident.

Figure 8:
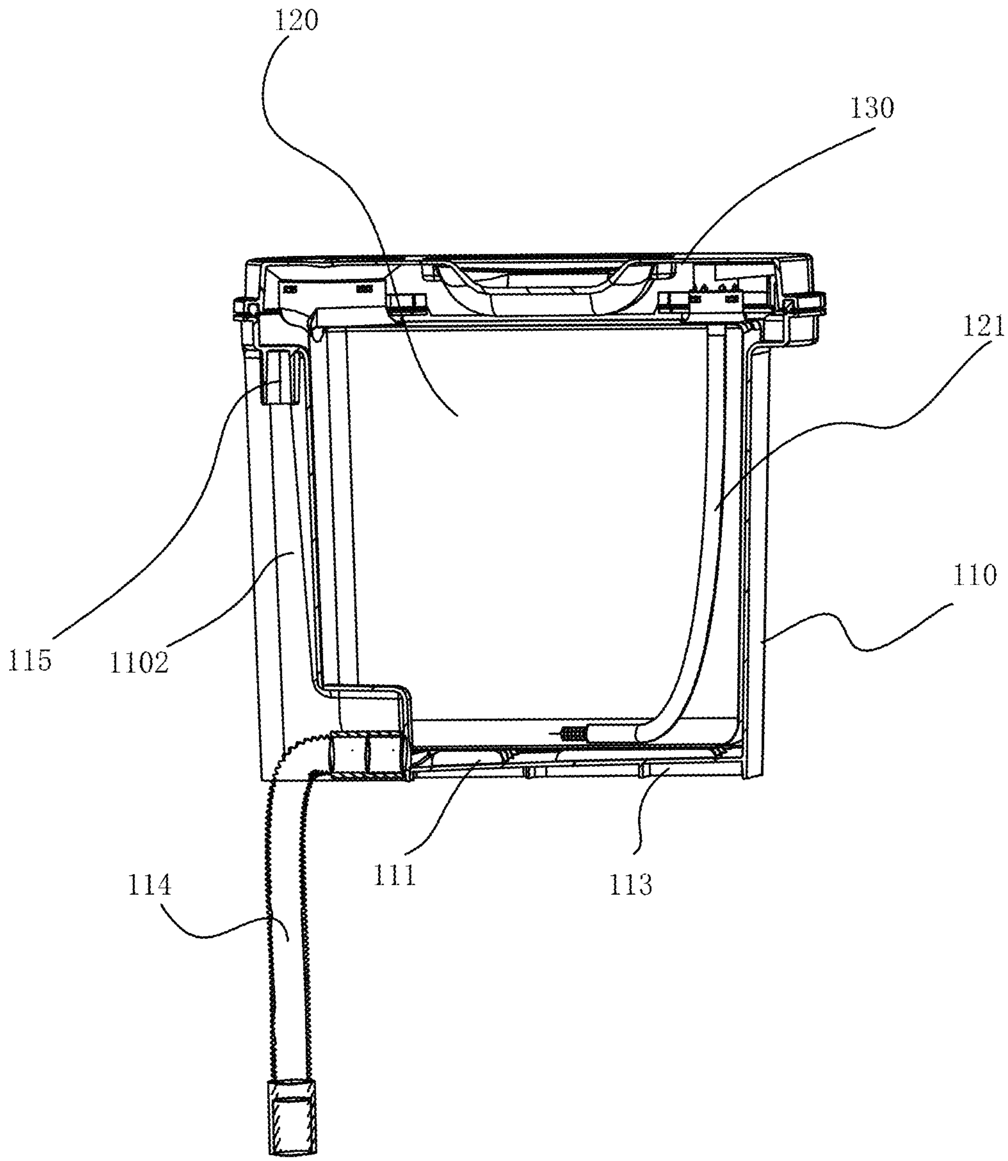
FIG. 8 is a cross-sectional view of the liquid tank.

Referring to FIG. 8, in this embodiment, the concave portion 1102 of the outer peripheral wall of the first liquid storage structure 110 is further provided with a drainage pipe fixing head 115, the drainage pipe fixing head 115 may be a plug-in post, and the drainage pipe 114 is plugged into the plug-in post to fix the tail of the drainage pipe 114 at the concave portion 1102 of the outer peripheral wall of the first liquid storage structure 110.

Of course, the drainage pipe fixing head 115 may also be an elastic clamp, which clamps the drainage pipe 114.

Furthermore, the concave portion 1102 of the outer peripheral wall of the first liquid storage structure 110 is L-shaped, the concave portion 1102 along the height direction of the outer peripheral wall of the first liquid storage structure 110 is configured to fix the tail of the drainage pipe 114, the concave portion 1102 along the length direction of the first liquid storage structure 110 is configured to connect the head of the drainage pipe 114, and the head of the drainage pipe 114 is in communication with the drainage outlet 1122.

Furthermore, a detachable end cap is connected to the tail of the drainage pipe 114.

In this embodiment, the structure wall at the upper opening of the first liquid storage structure 110 is provided there on with an exhaust opening 117, a cleaning liquid outlet 116 and a sewage inlet 118. The cleaning liquid outlet 116 is in communication with the second liquid storage structure 120 through a cleaning liquid pipe 121, and the base station 1 pumps out the cleaning solution in the second liquid storage structure 120 to clean the mop through a liquid pump.

Furthermore, the tail of the cleaning liquid pipe 121 is connected with a filter head. When the second liquid storage structure 120 contains cleaning solution, the cleaning solution may be primarily filtered through the filter head, e.g., to filter out small-particle impurities, such that the cleaning solution flowing out from the second liquid storage structure 120 can well clean the mop of the cleaning robot.

The exhaust opening 117 and the sewage inlet 118 are both in communication with the first liquid storage structure 110, and the base station 1 pumps air out of the first liquid storage structure 110 through an air pump that is in communication with the exhaust opening 117, such that negative pressure is formed in the first liquid storage structure 110, and sewage can be pumped into the first liquid storage structure 110 through the sewage inlet 118.

It shall be noted that, when the first liquid storage structure 110 is a rigid structure, the cleaning liquid outlet 116, the sewage inlet 118 and the exhaust opening 117 are all rigid connecting components formed on the first liquid storage structure 110. The cleaning liquid outlet 116, the sewage inlet 118, and the exhaust opening 117 are all convexly and integrally formed on the first liquid storage structure 110, the three openings are integrated onto one liquid storage structure, and thus the structure is simple and compact.

Figure 7:
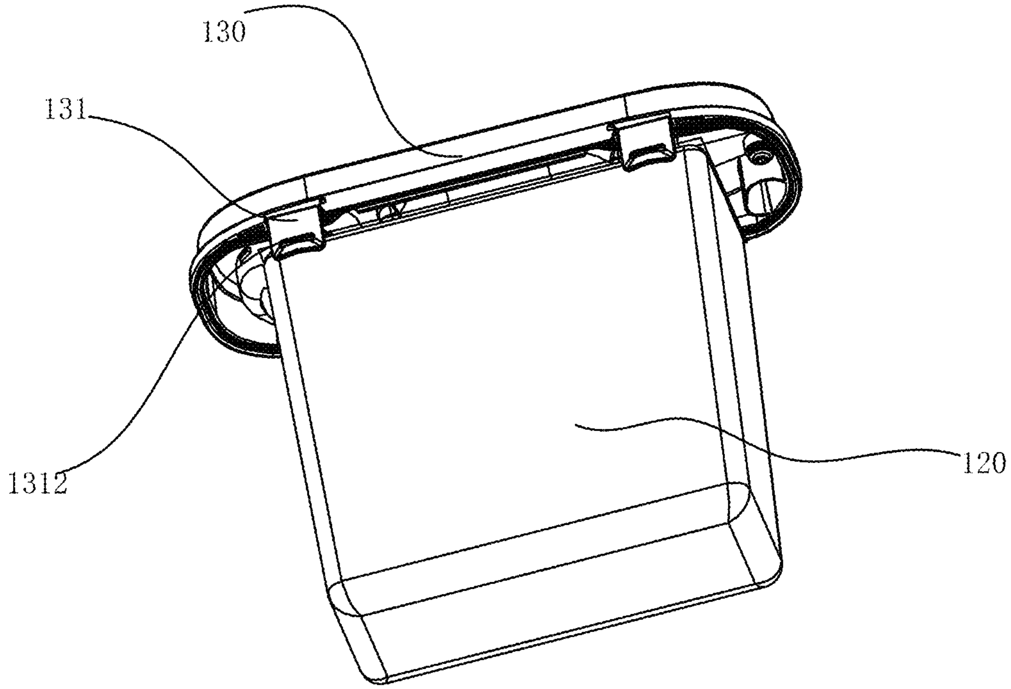
FIG. 7 is a schematic structural view of a box cover connected with a second liquid storage structure.

Furthermore, referring to FIG. 7, the liquid tank 100 further includes a box cover 130 detachably connected to the first liquid storage structure 110, the box cover 130 is provided thereon with a buckle 131, the buckle 131 is provided thereon with a buckle hole 1312, the outer peripheral wall of the first liquid storage structure 110 is provided thereon with a buckle protrusion 119, and the box cover 130 is detachably connected to the first liquid storage structure 110 through the engagement of the buckle hole 1312 and the buckle protrusion 119. In some embodiments, the upper end of the second liquid storage structure 120 is integrally connected with the box cover 130, such that it is easy to lift the second liquid storage structure 120 from the first liquid storage structure 110 by lifting the box cover 130, which facilitates the separation of the two liquid storage structures.

Another embodiment of the present disclosure further discloses a base station 1, referring to FIG. 1 to FIG. 9, the base station 1 includes the base station body 11 and the liquid tank 100 according to the above embodiments, and the liquid tank 100 is arranged in the base station body 11.

Specifically, the base station body 11 is formed with a cavity configured to accommodate the liquid tank 100.

In the base station 1 of this embodiment, the second liquid storage structure 120 of the liquid tank 100 is flexible and variable in volume, the liquid in the two liquid storage structures alternately increase and decrease, the liquid of the two liquid storage structures is stored in one box, whereby the base station 1 avoids the scheme in which two liquid storage tanks are required in the prior art, the volume occupied by the liquid tanks is reduced, the construction cost is decreased, and the storage space is increased. Secondly, the bottom surface of the first liquid storage structure 110 facing the second liquid storage structure 120 is provided with the anti-sticking structure. In this way, the structural wall of the second liquid storage structure 120 made of flexible material is prevented from sticking to the structural wall of the first liquid storage structure 110, which is beneficial to liquid circulation and separation of the two liquid storage structures.

It shall be noted that, the base station of the present disclosure is used in combination with the cleaning robot. The cleaning robot is provided with a wiper. When the cleaning robot finishes mopping the floor, the cleaning robot runs into the base station which is provided with a cleaning position for accommodating the cleaning robot, and the base station is provided thereon with a cleaning tank for cleaning the cleaning robot. Generally, the cleaning robot is provided thereon with two rotatable plates on which mops are fixed. When the cleaning robot moves to the cleaning position of the base station, the rotatable plates rotate, such that the mops can be cleaned by the cleaning piece on the cleaning tank. Of course, the base station is further provided thereon with a liquid outlet, the liquid outlet is in communication with the first liquid storage structure or the second liquid storage structure, so as to ensure that cleaning solution is supplied to the mops for cleaning the mops.

Of course, the base station is further provided thereon with other components, such as a charging component, a drying component, a blowing component, a voice reminding component and so on.

What described above are only some embodiments of the present disclosure and are not intended to limit the protective scope claimed in the present disclosure. Any equivalent structures or modifications that are made according to the specification and the attached drawings of the present disclosure under the concept of the present disclosure, or any direct/indirect applications of the present disclosure in other related technical fields shall all be included within the protective scope claimed in the present disclosure.

What is claimed is:

1. A liquid tank for a base station, comprising a first liquid storage structure and a second liquid storage structure;

the second liquid storage structure being positioned in the first liquid storage structure, the second liquid storage structure being flexible and variable in volume;

a space being defined between a structural wall of the first liquid storage structure and a structural wall of the second liquid storage structure, and the space being configured to store liquid; and the first liquid storage structure comprising an anti-sticking structure, the anti-sticking structure being positioned on a bottom surface of the first liquid storage structure facing the second liquid storage structure;

wherein the anti-sticking structure comprises convex structures, all the convex structures extend along a length direction of the bottom surface of the first liquid storage structure, the convex structures are arranged in a plurality of columns, the convex structures of each column are arranged at intervals, the convex structures comprise a plurality of convex ribs, and each of the convex ribs of each column is staggered with the convex ribs of an adjacent column.

2. The liquid tank of claim 1, wherein an edge of each convex rib is arc-shaped.

3. The liquid tank of claim 2, wherein a middle part of an upper end of each convex rib is concave.

4. The liquid tank of claim 1, wherein a long side direction of each convex rib is parallel to the length direction of the bottom surface of the first liquid storage structure, and the convex ribs in each row are arranged flush with each other.

5. The liquid tank of claim 1, wherein a long side direction of each convex rib is set at an angle with respect to the length direction of the bottom surface of the first liquid storage structure.

6. The liquid tank of claim 1, wherein the first liquid storage structure is configured to store sewage, the liquid tank further comprises a drainage pipe, a drainage outlet is defined at a bottom part of the first liquid storage structure, and the drainage pipe is connected with the drainage outlet.

7. The liquid tank of claim 6, wherein portion of an outer peripheral wall of the first liquid storage structure is concave, such that an inner peripheral wall of the first liquid storage structure is correspondingly convex to form a drainage part, a side surface of the drainage part facing the convex structure is a drainage surface, the drainage outlet is defined on the drainage surface, and the drainage pipe is accommodated in the concave portion of the outer peripheral wall of the first liquid storage structure.

8. The liquid tank of claim 7, wherein the concave portion of the outer peripheral wall of the first liquid storage structure is arranged at an edge of the outer peripheral wall of the first liquid storage structure.

9. The liquid tank of claim 7, wherein the concave portion of the outer peripheral wall of the first liquid storage structure is L-shaped, part of the concave portion along a height direction of the outer peripheral wall of the first liquid storage structure is configured to accommodate a tail of the drainage pipe, and another part of the concave portion along a length direction of the first liquid storage structure is configured to accommodate a head of the drainage pipe.

10. The liquid tank of claim 7, wherein the first liquid storage structure comprises a drainage pipe fixing head, the drainage pipe fixing head is positioned on the concave portion, and the drainage pipe is capable of being secured to the drainage pipe fixing head, such that a tail of the drainage pipe is located at the concave portion.

11. The liquid tank of claim 6, wherein a central axis of the drainage outlet is parallel to a horizontal line.

12. The liquid tank of claim 6, wherein the convex structures are arranged adjacent to the drainage outlet.

13. The liquid tank of claim 6, wherein a bottom wall of the first liquid storage structure comprises a blank part, a drainage part, and an anti-sticking part, the convex structures are positioned on the anti-sticking part, the blank part is obliquely arranged from an edge of the first liquid storage structure to the anti-sticking part, the anti-sticking part is obliquely arranged from a edge of the blank part to the drainage outlet, and the drainage outlet is arranged at a lowest end of the first liquid storage structure.

14. The liquid tank of claim 1, wherein the first liquid storage structure is a rigid shell, the first liquid storage structure comprises reinforcing ribs, and the reinforcing ribs are positioned on a bottom wall of the first liquid storage structure.

15. The liquid tank of claim 1, wherein the liquid tank comprises a box cover, an upper end of the second liquid storage structure is integrally connected with the box cover, the box cover comprises a buckle, the buckle defines a buckle hole, the first liquid storage structure comprises a buckle protrusion, the buckle protrusion is positioned on an outer peripheral wall of the first liquid storage structure, and the box cover is detachably connected to the first liquid storage structure through the engagement of the buckle hole and the buckle protrusion.

16. A base station, comprising a base station body and the liquid tank of claim 1, the liquid tank being arranged in the base station body.

17. The liquid tank of claim 1, wherein in two adjacent columns, each of the convex ribs of one column extends between two convex ribs of the other column.

* * * * *